United States Patent [19]

Mitani et al.

[11] Patent Number: 4,742,868
[45] Date of Patent: May 10, 1988

[54] REGENERATIVE HEATING APPARATUS

[75] Inventors: Akio Mitani, Yokohama; Koroku Endo, Tokyo, both of Japan

[73] Assignee: Kabushiki Kaisha Toshiba, Kawasaki, Japan

[21] Appl. No.: 845,868

[22] Filed: Mar. 28, 1986

[30] Foreign Application Priority Data

Mar. 30, 1985 [JP] Japan .................................. 60-66792

[51] Int. Cl.$^4$ ............................................. F28D 21/00
[52] U.S. Cl. .............................. 165/104.12; 62/480; 62/478; 62/477
[58] Field of Search ...................... 165/104.12; 62/478, 62/477, 481, 480, 235.1

[56] References Cited

U.S. PATENT DOCUMENTS 2,929,230 3/1960 Schmerzler ............................ 62/478
4,186,794 2/1980 Brunberg ................................ 165/2

FOREIGN PATENT DOCUMENTS 91382 10/1983 European Pat. Off. .............. 62/480
1894876 6/1964 Fed. Rep. of Germany .
312422 5/1929 United Kingdom .................. 62/477
1566218 4/1980 United Kingdom .
2088546 6/1982 United Kingdom .

OTHER PUBLICATIONS

IECEC 81, (1981), "Zeolite Heat Pump and Zeolite Heat Transformer for Load Management", G. Alefeld et al.
International Seminar on Thermochemical Energy Storat, (1980), "The TEPIDUS System for Seasonal Heat Storage and for Cooling", E. A. Brunberg et al.

Primary Examiner—Albert W. Davis, Jr.
Attorney, Agent, or Firm—Cushman, Darby & Cushman

[57] ABSTRACT

A regenerative heating apparatus includes a radiating container and an adsorbent contained in the container. The adsorbent adsorbs vapor to generate heat when touched by the vapor, and releases the adsorbed vapor when heated. A heater for heating the adsorbent is disposed in the container. The vapor released from the adsorbent is condensed by a condensor and then fed into a liquid tank, thereby a dried adsorbent is produced. In a heating operation, the liquid in the tank is fed to an evaporator by a pump and evaporated thereby. The resultant vapor is fed to the dried adsorbent, and the adsorbent adsorbs the vapor to generate heat, thereby heating air around the container.

12 Claims, 3 Drawing Sheets

REGENERATIVE HEATING APPARATUS

BACKGROUND OF THE INVENTION

The present invention relates to a regenerative heating apparatus, and more specifically to a regenerative heating apparatus utilizing non-peak power supply for thermal storage.

Heating apparatuses have conventionally been provided which utilize relatively cheap non-peak power supply for thermal storage and use the stored heat for a daytime heating operation. One such heating apparatus is designed so that heat can be stored in bricks or other heat storaging materials utilizing non-peak power, and the heat stored in this manner can be extracted either by natural convection or forced convection using fans to heat a room.

In the prior art regenerative heating apparatuses, however, the regenerative material may be heated to 600° to 700° C., and radiation during the thermal storage causes high heat loss. Even when the heating operation is stopped in the daytime, the amount of heat radiated from the regenerative material, i.e., heat loss, is so great that a room to be heated will inevitably be warmed by heat equivalent to the heat loss. Thus, unlike ordinary electric heating apparatuses, the regenerative heating apparatuses require complicated heating operation control, and wastefully radiate the stored heat, lowering heating efficiency.

SUMMARY OF THE INVENTION

The present invention is contrived in consideration of these circumstances, and is intended to provide a regenerative heating apparatus which can store heat making use of non-peak power supply, efficiently utilize the stored heat, and control the heating operation with ease.

A heating apparatus according to the present invention is constructed so as to heat a room taking advantage of the property of adsorbents, such as zeolite, of producing heat when adsorbing steam.

The heating apparatus of the invention comprises a radiating unit disposed in a room to be heated, the unit including a radiating container and an adsorbent contained in the container, for adsorbing vapor to produce heat when touched by the vapor and releasing the adsorbed vapor when heated; heating means in the heating container for heating the adsorbent; a condenser for condensing the vapor released from the adsorbent when the adsorbent is heated; a liquid tank containing an operation fluid therein; an evaporator for evaporating the working fluid; guide means for guiding the operation fluid vaporized by the evaporator into the radiating container and the fluid condensed by the condenser into the liquid tank, and valve means attached to the guide means between the radiating container and the evaporator, for controlling the passage of the working fluid through the guide means.

DETAILED DESCRIPTION OF THE PREFERRED EMBODIMENTS

Preferred embodiments of the present invention will now be described in detail with reference to the accompanying drawings.

Figure 1:
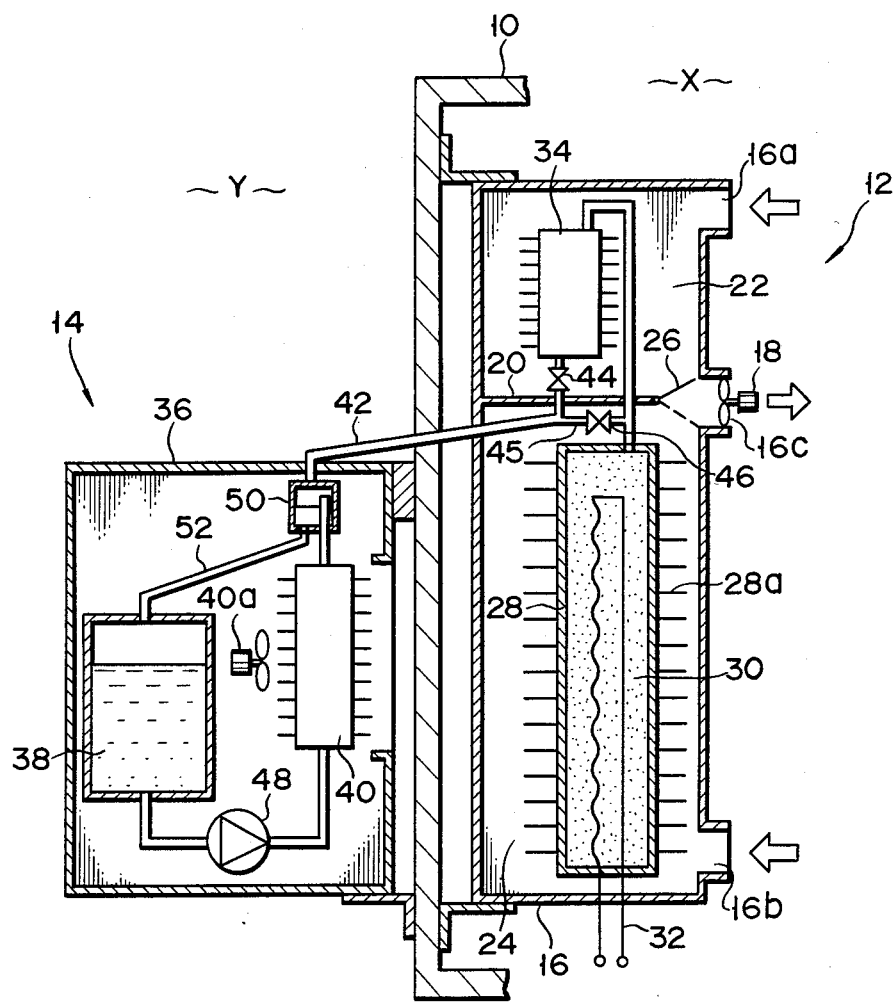
FIG. 1 is a sectional view of a heating apparatus according to a first embodiment of the present invention.

As shown in FIG. 1, a heating apparatus according to a first embodiment of the invention comprises indoor unit 12 on indoor side X and outdoor unit 14 on outdoor side Y separated by wall 10 of a structure.

Indoor unit 12 includes ventilating duct 16 which extends substantially vertically. First and second inlet ports 16a and 16b are formed at the upper and lower end portions of duct 16, respectively, and outlet port 16c is formed between the inlet ports. Ventilating fan 18 is disposed in port 16c. The interior of duct 16 is divided by partition wall 20 into condensing chamber 22 communicating with first inlet port 16a and radiating chamber 24 connecting with second inlet port 16b. Damper 26 is rockably mounted on wall 20, facing outlet port 16c. It rocks between first and second positions shown by full and broken lines, respectively, in FIG. 1. Outlet port 16c communicates with chambers 24 and 22 when damper 26 rocks to the first and second positions, respectively.

Radiating container 28 is provided in radiating chamber 24. It is formed of a material with high heat radiating capability, e.g., iron. A number of radiating fins 28a are arranged on the outer surface of the container. Container 28 contains therein adsorbent 30, such as zeolite, which adsorbs vapor and generates heat when touched by the vapor, and releases the adsorbed vapor when heated. The adsorbent is not limited to zeolite, and silica gel may be used in place of it. Also, electric heater 32 for heating adsorbent 30 is disposed in container 28. It is connected to a power source (not shown). Condensing chamber 22 contains condenser 34 for condensing the vapor released from the adsorbent.

Outdoor unit 14 has housing 36 in which are disposed liquid tank 38 containing an operation fluid, such as water, and evaporator 40 for evaporating the fluid. Evaporator 40 is adapted to fulfill its function when fan 40a, which faces it in housing 36, is actuated. It is lower in position than condenser 34.

Indoor and outdoor units 12 and 14 are connected by guide pipe 42 which extends through wall 10. Pipe 42 extends from the top of radiating container 28 to the bottom of liquid tank 38 through condenser 34 and evaporator 40. Valve 44 is attached to pipe 42 in the vicinity of the discharge-side of condenser 34. Guide pipe 42 includes bypass pipe 45 which extends from the region near valve 44 to the position near the upper end portion of container 28 to bypass valve 44 and condenser 34. Pipe 45 is provided with valve 46. Between tank 38 and evaporator 40, pipe 42 is fitted with liquid feed pump 48 as liquid feed means for feeding the water from tank 38 into evaporator 40. In the vicinity of the discharge side of evaporator 40, pipe 42 is fitted with gas-liquid separator 50 for separating liquid and vapor. The liquid collected in separator 50 is fed into liquid tank 38 through liquid feed pipe 52. That portion of guide pipe 42 which is located between condenser 34 and evaporator 40 is declined toward the evaporator so that the water condensed by the condenser naturally drops into separator 50. Container 28, condenser 34, evaporator 40, tank 38, and pipes 42 and 52 are evacuated for efficient evaporation of the water in evaporator 40.

Valves 44 and 46, fans 18 and 40a, heater 32, and liquid feed pump 48 are connected to a control device (not shown) for operation control.

Figure 2:
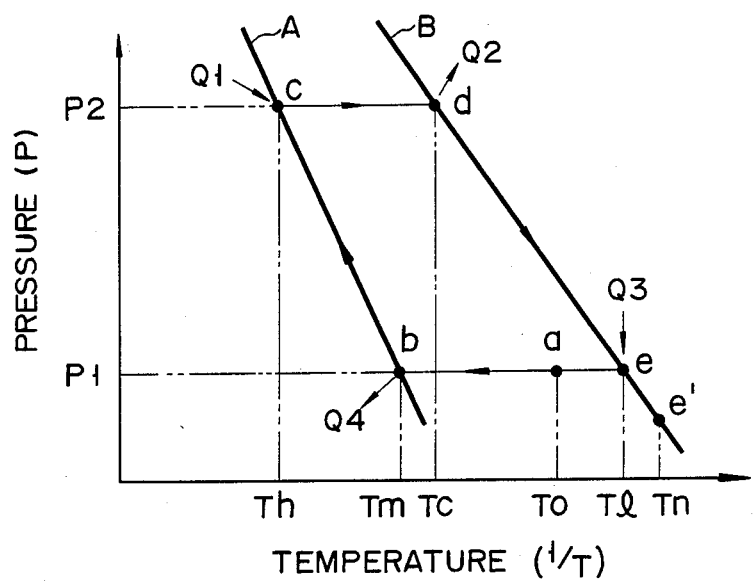
FIGS. 2 and 3 are cycle diagrams of the heating apparatus of FIG. 1.

Referring now to FIG. 2, the operation of the heating apparatus of the aforementioned construction will be described.

In FIG. 2, lines A and B represent equilibrium vapor pressure characteristics of water and adsorbent-water system, respectively. An initial state (point a) is assumed as a state in which adsorbent 30 maximally containing water is left as it is at room temperature To. The operation cycle of the heating apparatus consists of a regeneration mode in which adsorbent 30 is dried by the use of non-peak power supply, and a heating mode in which the adsorbent is supplied with steam for generation of heat.

REGENERATION MODE

Late at night, heater 32 is switched on by the control device. If adsorbent 30 is heated at temperature Th by heater 32, its temperature increases from point a to point b with vapor pressure Pl. Thereafter, the temperature and vapor pressure of adsorbent 30 increase along line A to reach point c. If the heating is continued further, water separates from adsorbent 30 so that a dried adsorbent and steam are produced. At this time, valves 44 and 46 are opened and closed, respectively, by the control device. Damper 26 is rocked to the second position indicated by broken line in FIG. 1, and fan 18 is actuated. Thus, air in a room is sucked into condensing chamber 22 through inlet port 16a, passes around condenser 34 to cool the same, and is then discharged into the room through outlet port 16c. The steam separated from adsorbent 30 flows into condenser 34 through guide pipe 42. After it is cooled to temperature Tc in the condenser, the steam is condensed at point d to discharge heat Q2 into chamber 22. Accordingly, the air passing through chamber 22 is slightly heated and then discharged into the room. The condensed water at temperature Tc flows into liquid tank 38 through valve 44, guide pipe 42, separator 50, and liquid feed pipe 52. Finally, the water is cooled to outside air temperature Tn.

When the water is removed from adsorbent 30, as described above, valve 44 is closed and fan 18 is stopped. At the same time, heater 32 is de-energized. Thus, the regeneration of adsorbent 30 ends.

HEATING MODE

When heating the room in the daytime, fan 40a and pump 48 are first started by the control device. Thereupon, the water in liquid tank 38 is fed through guide pipe 42 to evaporator 40 by pump 48. It is heated at outside air temperature Tl to be evaporated (point e) in evaporator 40. Also, valve 46 is opened and fan 18 is actuated by the control device, and damper 36 is rocked to the first position indicated by full line in FIG. 1. As a result, the steam produced in evaporator 40 flows into radiating container 28 via separator 50, guide pipe 42, bypass pipe 45, and valve 46. The water left unvaporized in evaporator 40 collects in separator 50, and is returned to liquid tank 38 through liquid feed pipe 52. Dried adsorbent 30 in radiating container 28 adsorbs the introduced steam, and generator heat at point b. Meanwhile, the air in the room is introduced into ventilating duct 16 through inlet port 16b by fan 18, flows around container 28, and then returns to the room through outlet port 16c. The air flowing through radiating chamber 24 is heated by heat Q4 radiated from adsorbent 30, and is then fed into the room. Thus, the room is heated.

In heightening the heating capability of the heating apparatus, the rotational frequency of pump 48 is increased to increase the flow rate of circulated water in evaporator 40. As a result, the amount of steam produced increases to enlarge the steam supply to radiating container 28, thereby increasing the amount of heat produced by adsorbent 30. More steam may be produced by increasing the rotating speed of fan 40a for a larger airflow, as well as by increasing the rotational frequency of pump 48. The heating capability can be lowered by reducing the rotational frequency of pump 48 or fan 40a.

In stopping the heating operation, valve 46 is closed and pump 48 and fans 18 and 40a are stopped by the control device. When the heating is stopped, a heat loss is caused only by radiation during a temperature drop of radiating container 28 from Tm to To. Usually, temperature Tm is about 70° C., and the heat loss is much less than in the case of the prior art apparatuses which use a regenerative material heated to 600° to 700° C.

The coefficient of performance of the heating apparatus constructed in this manner will now be described.

Figure 3:
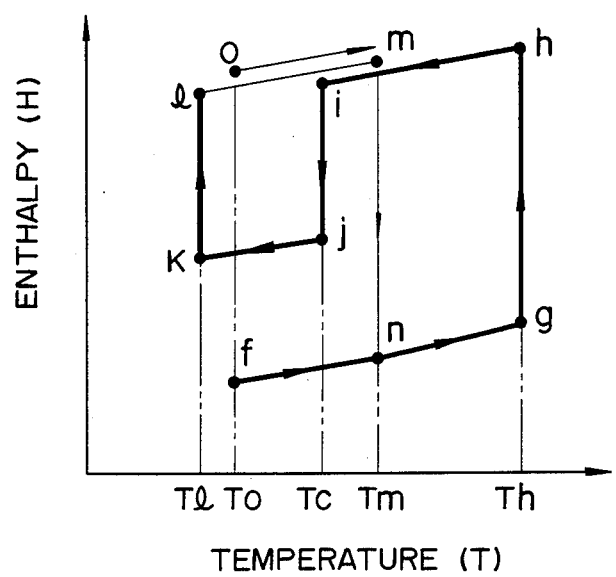

FIG. 3 is a cycle diagram in which axes of ordinate and abscissa represent enthalpy and temperature, respectively. In this diagram, point f indicates a state that adsorbent 30 maximally containing water is left at room temperature To.

When it is heated (at heating temperature Th) from point f by electric heater 32, adsorbent 30 increases its temperature to point g, and then releases water at point g to reach point h. Steam produced in this process is cooled by condenser 34 to reach point i. After it is condensed at point i, the steam advances to point j. Further, the condensed water is cooled to point k. During the heating operation, the water is heated by the outside air, advancing from point k to point x (evaporation). Steam produced by this evaporation is adsorbed by adsorbent 30, and heat is generated at point m. As the generation of heat advances, the enthalpy lowers to point n.

Thus, the thermal balance is as follows.

The input by heater 32 includes temperature increase Hfg (points f, g) of the adsorbent maximally containing water and amount of heat Hgh (points g, h) necessary for radiation at temperature Th.

On the other hand, the heat available for daytime heating includes heat of adsorption Hmn (points m, n) at temperature Tm, heat Hlm (points x, m) for the temperature increase of steam from Tl to Tm, and heat Hom (points o, m) for the temperature increase of adsorbent 30 from To to Tm. Accordingly, coefficient of performance $\eta$ is given by $$\eta = (Hmn - Hlm - Hom)/(Hfg + Hgh).$$

Let it be supposed that zeolite 13x is used for the adsorbent, and water is adsorbed to 20 percent by the adsorbent. Here we have conditions as follows:

Specific heat of zeolite: $Cz = 0.22$ kcal/kg°C.

Specific heat of water: $ClW = 1.0$ kcal/kg°C.

-continued

Specific heat of steam: $C_gW = 0.49$ kcal/kg°C.

Heat of adsorption:  $qa = 19.0$ kcal/mole · $H_2O$
= 1,056 kcal/kg · $H_2O$.

If outside air temperature $T1=0°$ C., regeneration temperature $Th=150°$ C., and room temperature $To=10°$ C., then $Tm=75°$ C. and $Tc=50°$ C. (from FIG. 3).

Thus, we obtain $$Hfg = Cz \times C^lW \times 0.2 \times (Th - To)$$
$$= 58.8 \text{ Kcal/kg} \cdot ZeO,$$

$$Hgh = qa \times 0.2$$
$$= 211.1 \text{ Kcal/kg} \cdot ZeO,$$

$$Hmn = qa \times 0.2$$
$$= 211.1 \text{ Kcal/kg} \cdot ZeO,$$

$$Hlm = C^gW \times 0.2 \times (Tm - T1)$$
$$= 7.4 \text{ Kcal/kg} \cdot Zeo, \text{ and}$$

$$Hom = Cz \times (Tm - To)$$
$$= 14.3 \text{ Kcal/kg} \cdot Zeo.$$

Therefore, $$\eta = (211.1 - 7.4 - 14.3)/(58.8 + 211.1)$$
$$= 0.70.$$

Thus, the thermal efficiency of the heating apparatus is as high as 70 percent, even though a heat loss for sensible heat is subtracted. If the apparatus is allowed to stand for a long time after the regeneration of the adsorbent, the heating operation can securely be performed with the 70-percent efficiency, without such a gradual decrease of the amount of stored heat due to radiation as is experienced by the prior art apparatuses.

According to this embodiment, moreover, condenser 34 is disposed within the room, that is, in ventilating duct 16, so that the heat of condensation and sensible heat of steam obtained in the regeneration mode may be utilized for heating. Thus, the performance of the heating apparatus can further be improved. If the sum of the heat of condensation and sensible heat (points h, i and j of FIG. 3) of the steam obtained from condenser 34 during the regeneration mode is $Hhi+Hij$ and another heat are represented by the same reference marks as in the above description, coefficient of performance $\eta$ is $$\zeta = (Hmn + Hhi + Hij - Hlm - Hom)/(Hfg + Hgh).$$

If the heat of condensation qw of the steam is 550 kcal/kg° C. with the other heat values maintained as aforesaid, we have $$Hhi = C_gW \times 0.2 \times (Th - Tm)$$
$$= 7.4 \text{ kcal/kg°C.} \cdot ZeO, \text{ and}$$

$$Hij = qw \times 0.2$$
$$= 110 \text{ kcal/kg°C.} \cdot ZeO.$$

Thus, the coefficient of performance is 114 percent, which ensures a highly efficient operation.

According to the heating apparatus constructed in this manner, heat is stored taking advantage of the relatively inexpensive non-peak power supply, and the stored heat can effectively be used for heating in the daytime. The heat storage period, i.e., the conduction time of the electric heater, must only be as long as the necessary time for the regeneration of the adsorbent. It is much shorter than in the case of the apparatuses which use a regenerative material such as brick. Moreover, the apparatus of the invention is subject to no heat loss after the regeneration of the adsorbent, and to less heat loss after the end of the heating operation. Accordingly, the thermal efficiency is improved, and the on-off control of the heating operation is reliable. In this embodiment, in particular, the condenser is disposed in the ventilating duct for further improved thermal efficiency.

Since the water in the liquid tank is fed into evaporator 40 by liquid feed pump 48, plenty of water circulates in the evaporator, producing much steam. Thus, the apparatus can enjoy high heating capability. When a large quantity of water is supplied to the evaporator, part of the water may possibly be fed, together with steam, into radiating container 28 without being vaporized. If supplied with water, the adsorbent will produce less heat. According to this embodiment, however, if the unvaporized water is discharged from the evaporator, it is separated from the steam and returned to the liquid tank by gas-liquid separator 50 which is provided on the discharge side of the evaporator. If the heating load is great, therefore, the discharge of the liquid feed pump may be increased to sufficiently enhance the heating capability of the apparatus.

Figure 4:
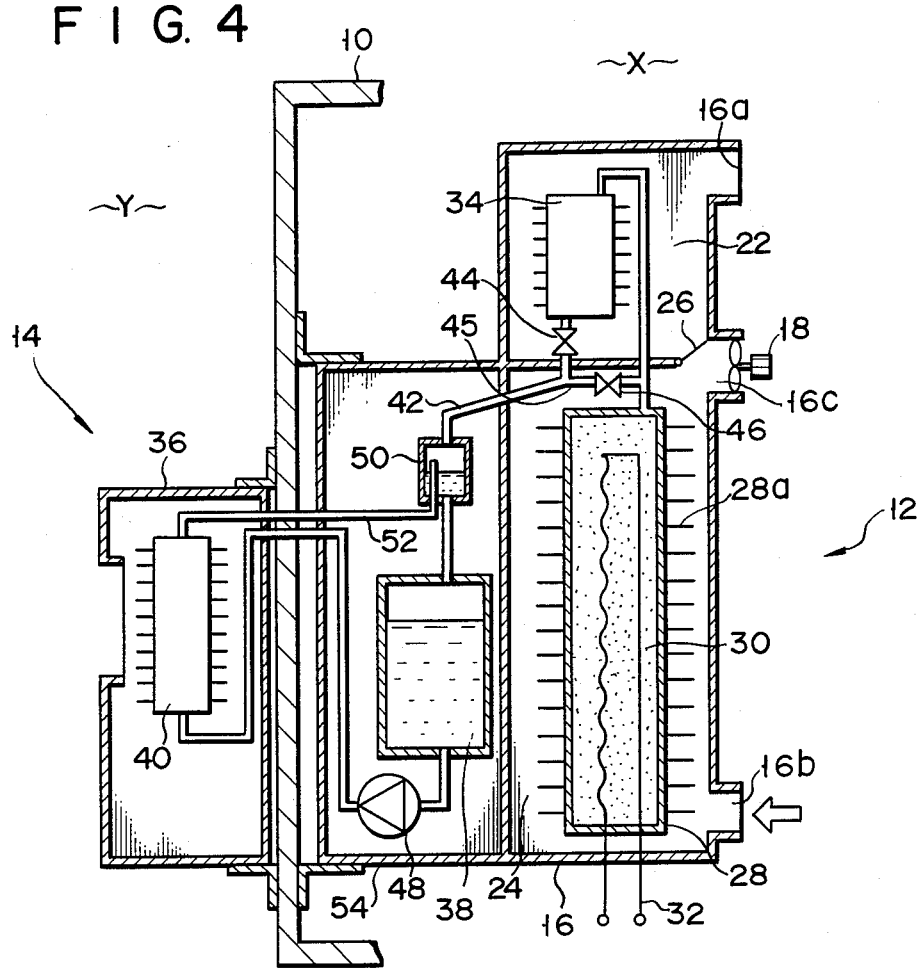
FIG. 4 is a sectional view of a heating apparatus according to a second embodiment of the invention.

FIG. 4 shows a second embodiment of the present invention. In this embodiment, like reference numerals are used to designate like portions as used in the first embodiment, and a description of those portions is omitted herein.

According to the second embodiment, liquid tank 38, liquid feed pump 48, and separator 50 are provided in indoor unit 12, and only evaporator 40 is disposed in outdoor unit 14. Sub-housing 54 is fixed to the outer surface of ventilating duct 16, and tank 38, pump 48, and separator 50 are arranged in the sub-housing.

Besides having the same effects of the first embodiment, the second embodiment provides the following results. Since liquid tank 38 is disposed indoors, the working fluid can be protected against freezing. As mentioned before, that portion of guide pipe 42 between condenser 34 and separator 50 must be declined toward the separator. If the slant portion of pipe 42 is located between indoor and outdoor units 12 and 14, moreover, the units are limited in their relative mounting positions. According to the second embodiment, however, the slant portion of the guide pipe is located within the indoor unit, so that the relative positions of the two units need not be considered much, improving the mounting efficiency of the heating apparatus.

It is to be understood that the present invention is not limited to the embodiments described above, and that various changes and modifications may be effected therein by one skilled in the art without departing from the scope or spirit of the invention.

Figure 5:
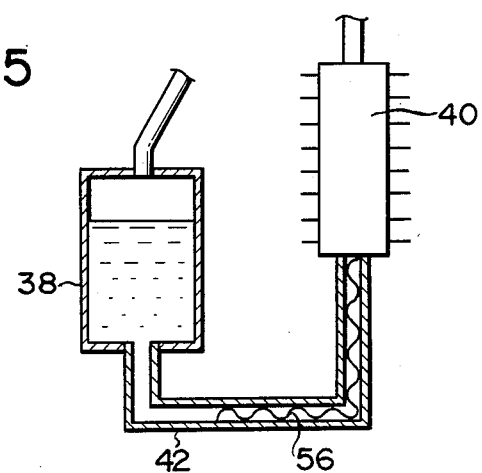
FIG. 5 is a sectional view showing a modification of liquid feeding means.

For example, the working fluid is not limited to water, and alcohol or an antifreezing solution may be used instead. Available antifreezing solutions include aqueous solutions of salt, calcium chloride, ethylene glycol, propylene glycol, etc. Although the condenser is provided in the ventilating duct in the aforementioned embodiments, it may be disposed outside the duct or outdoors. Even in the case, a sufficient effects can be obtained. In the above embodiments, moreover, the operation fluid is forcedly circulated by means of the liquid feed pump. Alternatively, however, it may be fed into the evaporator by its own pressure without the use of any pump or other liquid feed means. The liquid feed means is not limited to the liquid feed pump, and may alternatively includes wick 56 provided in guide pipe 42 between liquid tank 38 and evaporator 40, as shown in FIG. 5.

What is claimed is:

1. A regenerative heating apparatus comprising:
   a radiating unit located in a place to be heated, said unit including a radiating container and an adsorbent contained in the container, for adsorbing vapor to generate heat when touched by the vapor and releasing the adsorbed vapor when heated;
   electric heating means for heating the adsorbent;
   a condenser located in the place to be heated, for condensing the vapor released from the adsorbent when the adsorbent is heated;
   a liquid tank containing a working fluid therein;
   an evaporator for evaporating the working fluid;
   guide means for guiding the working fluid, the guide means including a first pipe for guiding the working fluid from the tank to the evaporator, a second pipe for guiding the fluid from the evaporator to the radiating container, a third pipe for guiding the vapor released from the adsorbent to the condensor, a fourth pipe having one end connected to the condenser and the other end connected to the second pipe, and a fifth pipe having one end connected to the second pipe and the other end connected to the tank, so that fluid from the condenser may be guided to the tank through the fourth pipe, a part of the second pipe and the fifth pipe;
   valve means arranged in the guide means between the radiating container and the evaporator, for controlling the passage of the working fluid through the guide means; and
   ventilating means for forcedly ventilating the air in the place to be heated, through the region around the radiating container or the condenser, so as to heat the air.

2. The heating apparatus according to claim 1, which further comprises liquid feed means arranged in the first pipe, for forcedly feeding the working fluid from the liquid tank to the evaporator; and a gas-liquid separator arranged in the second pipe, for separating the working fluid discharged from the evaporator into vapor and liquid, and guiding the separated liquid to the tank through the fifth pipe.

3. The heating apparatus according to claim 1, wherein said valve means includes a first valve attached to the second pipe to control the flow of the vapor introduced into the radiating container and to prevent the vapor released from the adsorbent from passing the second pipe, and a second valve attached to the fourth pipe to prevent the vapor supplied from the evaporator from flowing into the condensor.

4. The heating apparatus according to claim 2, wherein said liquid feed means includes a variable-exhaust amount type pump.

5. The heating apparatus according to claim 2, wherein said liquid feed means includes a wick disposed in the guide pipe.

6. The heating apparatus according to claim 1, wherein said radiating container includes a number of radiating fins on the outer surface thereof.

7. The heating apparatus according to claim 1, wherein said ventilating means includes a ventilating duct having an inlet port and an outlet port and housing the radiating container, and introducing means for introducing air from the place to be heated into the ventilating duct through the inlet port to circulate the air around the radiating container and then discharging the air into the place through the outlet port.

8. The heating apparatus according to claim 7, wherein said ventilating duct includes a partition wall for dividing the inside of the duct into a condensing chamber and a radiating chamber communicating with the inlet port and containing the radiating container, and another inlet port communicating with the condensing chamber, said ventilating means includes a damper attached to the partition wall to be movable between a first position where the damper connects the outlet port and the radiating chamber and a second position where the damper connects the outlet port and the condensing chamber, and said condenser is disposed in the condensing chamber.

9. The heating apparatus according to claim 8, wherein said introducing means includes a fan opposed to the outlet port, for, when the damper is in the first position, drawing the air from the place into the radiating chamber through the inlet port to circulate the air around the radiating container and then discharging the air through the outlet port, and, when the damper is in the second position, drawing cool air from the place into the condensing chamber through another inlet port to circulate the air around the condenser and then discharging the air into the place through the outlet port.

10. The heating apparatus according to claim 1, wherein said liquid tank is disposed in a space to be heated.

11. The heating apparatus according to claim 1, wherein said operation fluid is one of water, alcohol or an antifreeze solution.

12. The heating apparatus according to claim 1, wherein said adsorbent is at least one of silica gel or zeolite.

* * * * *